UNITED STATES PATENT OFFICE.

FRANK K. CAMERON AND JOHN A. CULLEN, OF WASHINGTON, DISTRICT OF COLUMBIA.

METHOD OF TREATING ALUNITE.

1,239,768.   Specification of Letters Patent.   Patented Sept. 11, 1917.

No Drawing.   Application filed November 11, 1916.   Serial No. 130,859.

*To all whom it may concern:*

Be it known that we, (1) FRANK K. CAMERON and (2) JOHN A. CULLEN, citizens of the United States, residing at (1) Washington, in the District of Columbia, (2) Washington, in the District of Columbia, have invented certain new and useful Improvements in Methods of Treating Alunite, of which the following is a specification.

This invention relates to methods of treating alunite or like minerals of a basic character, for the purpose of producing therefrom alum and aluminum sulfate.

According to the preferred embodiment of our invention the alunite is pulverized, say to ten or twenty mesh, and is then mixed with sulfuric acid, acid of 50° Baumé or higher concentration being preferred. Alunite is an impure basic sulfate of aluminum and potassium, and the proportion of acid used should be sufficient for the neutralization of the basic salt. In practice a proportion of acid slightly in excess of the above requirement is used. Inasmuch as the alunites vary considerably in their constitution, the required proportion of sulfuric acid to alunite should be calculated from analysis.

The mixture prepared as above is heated to 150°–200° C. to initiate the neutralizing reaction. This reaction is exothermic and takes place rapidly, resulting in the formation of a solid cake. This cake is for the most part soluble in water, and alum and aluminum sulfate may be extracted from it.

To the cake prepared as above there is added a limited proportion of water, the quantity of water being sufficient to hydrate the cake; that is to say to provide 24 molecules of water of crystallization for the alum component, and 18 molecules for the aluminum sulfate component. In practice the water is used in slight excess of the proportion required for hydration as above. A ten per cent. excess of water has been found to give satisfactory results.

Thereupon the mass is heated in order to effect solution of its components. Further addition of water is not necessary for this purpose, inasmuch as both of the salts mentioned above dissolve at moderate temperatures in their own water of crystallization.

If the alunite is a high grade material there will remain at this stage a small residue of ferruginous and silicious character. The hot solution is separated from this residue by decantation or filtration, and is thereupon permitted to cool to about ordinary temperature, say to 25° C. We have found that under these conditions practically all of the potassium of the alunite separates out in the form of alum crystals (potassium alum, $Al_2 3SO_4 . K_2SO_4 . 24H_2O$).

The alum crystals are separated from the mother-liquor, for example by centrifuging, and after washing and drying, or purification by recrystallization if desired, constitute the first marketable product.

A small amount of aluminum sulfate separates as a rule with the alum. Practically all of the aluminum sulfate however remains in solution in the mother-liquor. Owing to the fact that a slight excess of water was employed in the hydration of the cake as above stated the aluminum sulfate remains dissolved at this stage of the process; and the excess of water employed for hydration, after allowing for losses by evaporation, etc., is approximately the minimum amount which will serve to keep practically all of the aluminum sulfate in solution during the crystallization of the alum. This aluminum sulfate solution practically free from alum may now be concentrated in order to recover the aluminum sulfate in its hydrated or anhydrous form as may be desired. The final mother-liquor contains all of the dissolved impurities, mostly ferruginous in character and may be further treated as desired. For example it may serve directly as a source of impure aluminum sulfate, or it may be purified by known methods and returned to the process at the aluminum sulfate separation stage.

Obviously the aluminum sulfate mother-liquor from the alum crystallization may be treated in any desired manner for the recovery of its values. For example, alumina may be obtained therefrom by evaporation and calcination; or hydrated alumina may be obtained by the known aqueous precipitation methods.

We claim:—

1. A method of treating alunite, comprising reacting thereon with strong sulfuric acid in proportion sufficient to neutralize the basic compound with formation of a solid cake, hydrating the cake and heating to effect solution of the aluminum salts, crystallizing out alum from the resulting solution by cooling, and recovering an aluminum compound from the mother-liquor.

2. A method of treating alunite, comprising reacting thereon with strong sulfuric acid in proportion sufficient to neutralize the basic compound with formation of a solid cake, hydrating the cake and heating to effect solution of the aluminum salts, and crystallizing aluminum sulfate from the mother-liquor.

3. In a method of treating alunite, the step which consists in reacting thereon with sufficient strong sulfuric acid to neutralize the basic compound, producing directly thereby a solid cake which is largely water-soluble.

In testimony whereof, we affix our signatures.

FRANK K. CAMERON.
JOHN A. CULLEN.